United States Patent
Strong et al.

(10) Patent No.: US 10,474,183 B2
(45) Date of Patent: Nov. 12, 2019

(54) CLOCK DISTRIBUTION SYSTEM

(71) Applicants: Joshua A. Strong, Ellicott City, MD (US); Max Earl Nielsen, Odenton, MD (US)

(72) Inventors: Joshua A. Strong, Ellicott City, MD (US); Max Earl Nielsen, Odenton, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/160,419

(22) Filed: Oct. 15, 2018

(65) Prior Publication Data

US 2019/0155326 A1    May 23, 2019

Related U.S. Application Data

(63) Continuation of application No. 15/816,518, filed on Nov. 17, 2017, now Pat. No. 10,133,299.

(51) Int. Cl.
    *G06F 1/10*    (2006.01)
(52) U.S. Cl.
    CPC ...................... *G06F 1/10* (2013.01)
(58) Field of Classification Search
    None
    See application file for complete search history.

(56) References Cited

U.S. PATENT DOCUMENTS

| | | | | |
|---|---|---|---|---|
| 3,619,504 A | * | 11/1971 | De Veer | G06F 13/4072 178/70 M |
| 5,365,205 A | * | 11/1994 | Wong | G06F 13/4077 333/109 |
| 5,432,486 A | * | 7/1995 | Wong | H01R 12/62 333/109 |
| 5,638,402 A | * | 6/1997 | Osaka | H04L 25/0266 375/219 |
| 5,990,721 A | | 11/1999 | Mellitz | |

(Continued)

FOREIGN PATENT DOCUMENTS

WO    20160209387 A1    12/2016

OTHER PUBLICATIONS

Japanese Office Action corresponding to Japanese Application No. 2017-562039 dated Dec. 25, 2018.

(Continued)

*Primary Examiner* — Jeffery S Zweizig
(74) *Attorney, Agent, or Firm* — Tarolli, Sundheim, Covell & Tummino LLP

(57) ABSTRACT

One embodiment includes a clock distribution system. The system includes at least one resonator spine that propagates a sinusoidal clock signal and at least one resonator rib conductively coupled to the at least one resonator spine and arranged as a standing wave resonator. The system also includes at least one transformer-coupling line. Each of the at least one transformer-coupling line is conductively coupled to an associated circuit and has a plurality of inductive couplings to the at least one resonator rib to inductively generate a clock current corresponding to the sinusoidal clock signal via each of the plurality of inductive couplings in an additive manner to provide functions for the associated circuit.

20 Claims, 8 Drawing Sheets

(56) References Cited

U.S. PATENT DOCUMENTS

| | | |
|---|---|---|
| 6,563,358 B1 | 5/2003 | Goulette |
| 6,978,328 B1 * | 12/2005 | Osaka ............... H05K 1/0228 |
| | | 365/52 |
| 7,145,408 B2 | 12/2006 | Shepard et al. |
| 7,880,551 B2 | 2/2011 | Chan et al. |
| 9,634,654 B2 | 4/2017 | Bucelot et al. |
| 9,722,589 B1 | 8/2017 | Talanov et al. |
| 2007/0285179 A1 | 12/2007 | Ikeda et al. |

OTHER PUBLICATIONS

International Written Opinion and Search Report corresponding to International Application No. PCT/US2018/058243 dated Jan. 30, 2019.

European Examination Report corresponding to EP Patent Application No. 16 726 447.2-1206 dated Apr. 25, 2019.

Chi V L: "Salphasic Distribution of Clock Signals for Synchrc" IEEE Transactions on Computers, IEEE Service Center, Los Al vol. 43, No. 5, May 31, 1994 (May 31, 1994 ), pp. 597-602, XP000442053,ISSN: 0018-9340, DOI: 10.1109/12.280806.

Chi V L. "Salphasic Distribution of Clock Signals for Synchronous Systems", IEEE Transactions on Computers, IEEE Service Center, vol. 43, No. 5, May 1, 1994.

Korean Office Action for Application Serial No. 10-2017-7037126 dated May 29, 2019.

Herr, Q. et al: "Ultra-Low-Power 1-20 Superconductor Logic," arxiv.org, Cornell University Library, 201 Olin Library Cornell University Ithaca, NY 14853, Mar. 22, 2011 (Mar. 22, 2011) the whole document.

International Search Report corresponding to International Application No. PCT/US2019/018396 dated Apr. 25, 2019.

* cited by examiner

CLOCK DISTRIBUTION SYSTEM

RELATED APPLICATIONS

This application claims priority from U.S. patent application Ser. No. 15/816,518, filed 17 Nov. 2017, which is incorporated herein in its entirety.

TECHNICAL FIELD

The present invention relates generally to computer systems, and specifically to a clock distribution system.

BACKGROUND

Typical circuits that implement logic functions can operate based on a clock to synchronize data and/or provide a time-based flow of the logic functions. Circuits that are based on complementary metal-oxide-semiconductor (CMOS) technology can implement a clock to indicate when a given logic circuit or gate is to capture data at one or more inputs for processing or transferring the data to other logic functions. A given clock can thus provide a clock signal to a variety of devices in the circuit to provide the requisite timing information, and thus to substantially synchronize data transfer and timing functions. Other types of circuits can implement clock signals, such as reciprocal quantum logic (RQL) circuits. RQL circuits can implement timing information based on a clock that is provided, for example, as a sinusoidal signal having a substantially stable-frequency.

SUMMARY

One embodiment includes a clock distribution system. The system includes at least one resonator spine that propagates a sinusoidal clock signal and at least one resonator rib conductively coupled to the at least one resonator spine and arranged as a standing wave resonator. The system also includes at least one transformer-coupling line. Each of the at least one transformer-coupling line is conductively coupled to an associated circuit and has a plurality of inductive couplings to the at least one resonator rib to inductively generate a clock current corresponding to the sinusoidal clock signal via each of the plurality of inductive couplings in an additive manner to provide functions for the associated circuit.

Another embodiment includes a clock distribution system. The system includes at least one resonator spine that propagates a sinusoidal clock signal and at least one resonator rib conductively coupled to the at least one resonator spine and arranged as a standing wave resonator. The system further includes at least one transformer-coupling line. Each of the at least one transformer-coupling line is conductively coupled to an associated circuit and includes a plurality of bends to form a plurality of inductive-coupling portions. Each of the plurality of inductive coupling portions can be inductively coupled to the at least one resonator rib to inductively generate a clock current corresponding to the sinusoidal clock signal to provide functions for the associated circuit.

Another embodiment includes a clock distribution system. The system includes at least one resonator spine that propagates a sinusoidal clock signal and at least one resonator rib conductively coupled to the at least one resonator spine and arranged as a standing wave resonator. Each of the at least one resonator rib comprising a plurality of bends to provide a plurality of parallel portions. The system further includes at least one transformer-coupling line. Each of the at least one transformer-coupling line can be conductively coupled to an associated circuit. Each of the at least one transformer-coupling line can be inductively coupled to the plurality of the parallel portions of the at least one resonator rib to inductively generate a clock current corresponding to the sinusoidal clock signal to provide functions for the associated circuit.

DETAILED DESCRIPTION

The present invention relates generally to computer systems, and specifically to a clock distribution system. The clock distribution system, as described herein, is arranged as a resonator "spine" and "rib" configuration. As described herein, the term "spine", as pertaining to the resonator, describes a conductor that is configured to propagate a sinusoidal clock signal (e.g., an in-phase or quadrature-phase clock signal). The term "rib", as pertaining to the resonator, describes a conductor that is conductively coupled to the spine and is arranged as a standing-wave resonator that propagates the sinusoidal clock signal. The clock distribution system can include a plurality of resonator ribs that are each conductively coupled to the same resonator spine, and thus can each separately propagate the sinusoidal clock signal from the resonator spine.

In addition, the clock distribution system includes at least one transformer-coupling line that is conductively coupled to an associated circuit. The transformer-coupling line(s) are inductively coupled to the resonator rib(s) via a plurality of inductive couplings to inductively generate a clock current corresponding to the sinusoidal clock signal to provide functions for the associated circuit. As described herein, there a multitude of different configurations of the resonator rib and spine, and thus a multitude of different ways to provide the inductive couplings of the transformer-coupling line(s) to the resonator rib(s). In each of the different configurations described herein, the inductive coupling of the transformer-coupling line to the resonator rib(s) is provided in a manner that mitigates non-uniformity of the induced clock current in the transformer-coupling line relative to a different transformer-coupling line inductively coupled to the same resonator rib(s).

Figure 1:
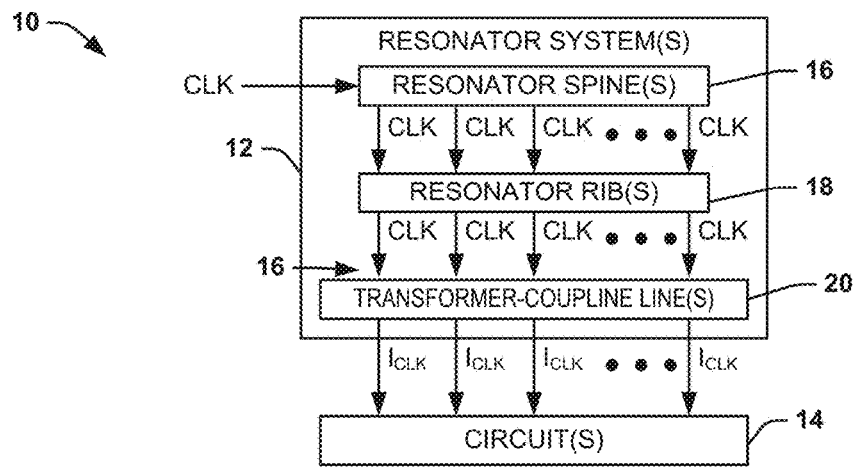
FIG. 1 illustrates an example of a clock distribution system.

FIG. 1 illustrates an example of a clock distribution system 10. The clock distribution system 10 can be implemented in a variety of applications, such as in a reciprocal quantum logic (RQL) circuit design. For example, the clock distribution system 10 can be implemented in or as part of an integrated circuit (IC) chip.

The clock distribution system 10 includes at least one resonator system 12. The resonator system(s) 12 can be configured to provide a clock signal CLK to each of a respective one or more circuits 14 that may be distributed across an IC chip in which the clock distribution system 10 is implemented, as described herein. In the example of FIG. 1, each of the resonator system(s) 12 includes at least one resonator spine 16 and at least one resonator rib 18. The resonator rib(s) 18 are each conductively coupled to a given one of the resonator spine(s) 16. Thus, the clock signal CLK, provided to the resonator spine(s) 16 (e.g., from a local oscillator), can be provided to propagate on each of the respective resonator rib(s) 18.

In the example of FIG. 1, the resonator system 12 also includes at least one transformer-coupling line 20. Each of the transformer-coupling line(s) 20 can be inductively coupled to one or more of the resonator rib(s) 18 to inductively provide a clock current $I_{CLK}$ to an associated one of the circuit(s) 14. Particularly, the transformer-coupling line (s) 20 are inductively coupled to the respective resonator rib(s) 18 via a plurality of inductive couplings to inductively generate the clock current $I_{CLK}$ corresponding to the sinusoidal clock signal to provide functions (e.g., timing functions and/or power distribution functions) for the associated circuit(s) 14. As described herein, there can be a multitude of different configurations of the resonator rib(s) 18 and spine(s) 16, and thus a multitude of different ways to provide the inductive couplings of the transformer-coupling line(s) 20 to the resonator rib(s) 18. In each of the different configurations described herein, the inductive couplings of a given one of the transformer-coupling line(s) 20 to the resonator rib(s) 18 is provided in a manner that mitigates non-uniformity of the induced clock current $I_{CLK}$ in the given one of the transformer-coupling line(s) 20 relative to a different one of the transformer-coupling line(s) 20 that is likewise inductively coupled to the same resonator rib(s) 18.

Figure 2:
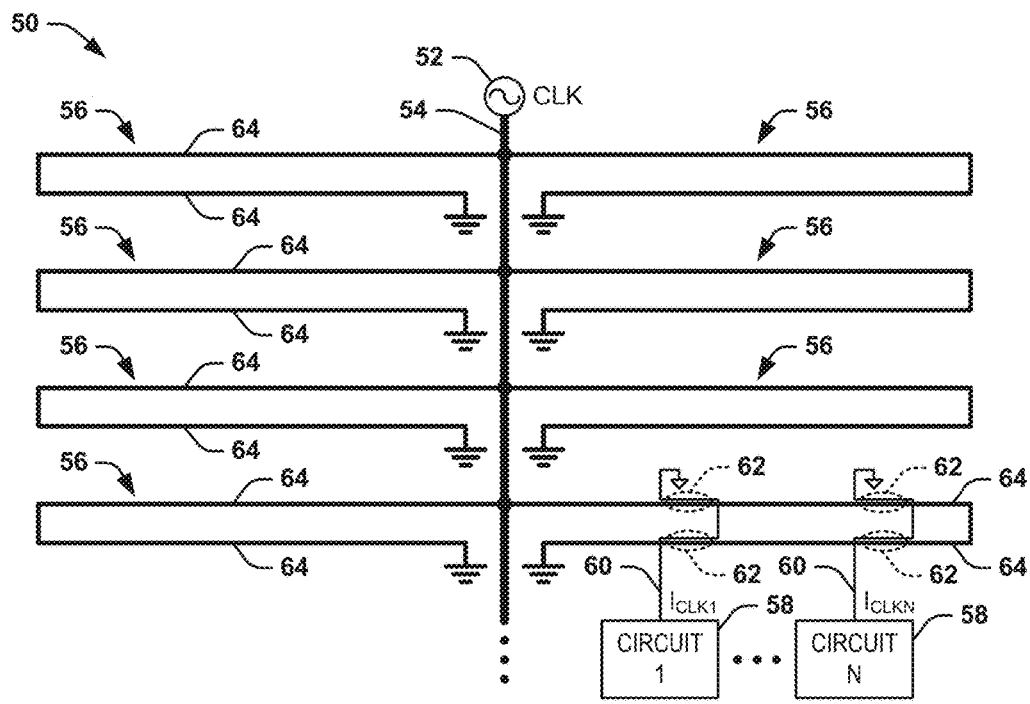
FIG. 2 illustrates an example of a resonator system.

FIG. 2 illustrates an example of a resonator system 50. The resonator system 50 can correspond to one of the resonator system(s) 12 in the example of FIG. 1. Therefore, reference is to be made to the example of FIG. 1 in the following description of the example of FIG. 2.

The resonator system 50 includes a signal source 52 that is configured to provide the clock signal CLK. The signal source 52 is coupled to a resonator spine 54 that is arranged as a conductor to propagate the clock signal CLK. In the example of FIG. 2, the resonator system 50 includes a plurality of resonator ribs 56 that are conductively coupled to the resonator spine 54 to likewise propagate the clock signal CLK. As an example, each of the resonator ribs 56 can be configured as standing-wave resonators, such that each of the resonator ribs 56 can have a physical length that is approximately equal to a predetermined length associated with a wavelength of the clock signal CLK. For example, each of the resonator ribs 56 can have a total length "L" from the conductive coupling to the resonator spine 54 to an end that is coupled to a low-voltage rail (e.g., ground) that is approximately equal to one-quarter of the wavelength λ of the clock signal CLK (i.e., λ/4). Therefore, based on the standing-wave resonator configuration of the resonator ribs 56, the clock signal CLK can have a magnitude that is greatest at the grounded end, and is least at the conductively-coupled end.

In the example of FIG. 2, a plurality N of circuits 58 are each demonstrated as inductively coupled to one of the resonator ribs 56 via a respective transformer-coupling line 60. The inductive coupling of the respective circuits 58 to the resonator rib 56 is provided through a plurality of inductive couplings 62 associated with each respective transformer-coupling line 60. In the example of FIG. 2, the multiple inductive couplings 62 is provided based on the resonator rib 56 including multiple bends (e.g., rounded or angular) to provide a pair of parallel portions 64 of the resonator rib 56 to arrange the grounded-end of the resonator rib 56 to be proximal to the resonator spine 54. As described herein, each of the inductive couplings 62 is between a respective inductive-coupling portion of the transformer-coupling line 60 and a portion of the resonator rib 56 (e.g., an extension along one of the parallel portions 64 of the resonator rib 56). Therefore, the transformer-coupling line 60 cooperates with the resonator rib 56 to form a transformer at each of the inductive couplings 62, such that each of the inductive couplings 62 provides a portion of the clock signal CLK to be induced as a portion of respective clock currents $I_{CLK1}$ through $I_{CLKN}$ that are provided to the respective circuits 58. Thus, the inductive couplings 62 inductively provide the clock currents $I_{CLK}$ corresponding to the clock signal CLK to the circuits 58 in an additive manner with respect to each of the parallel portions 64. Based on the bends of the resonator rib 56, the additive manner of the inductive generation of the clock currents $I_{CLK}$ can be such that each of the clock currents $I_{CLK1}$ through $I_{CLKN}$ can be approximately uniform with respect to the circuits 58.

Figure 3:
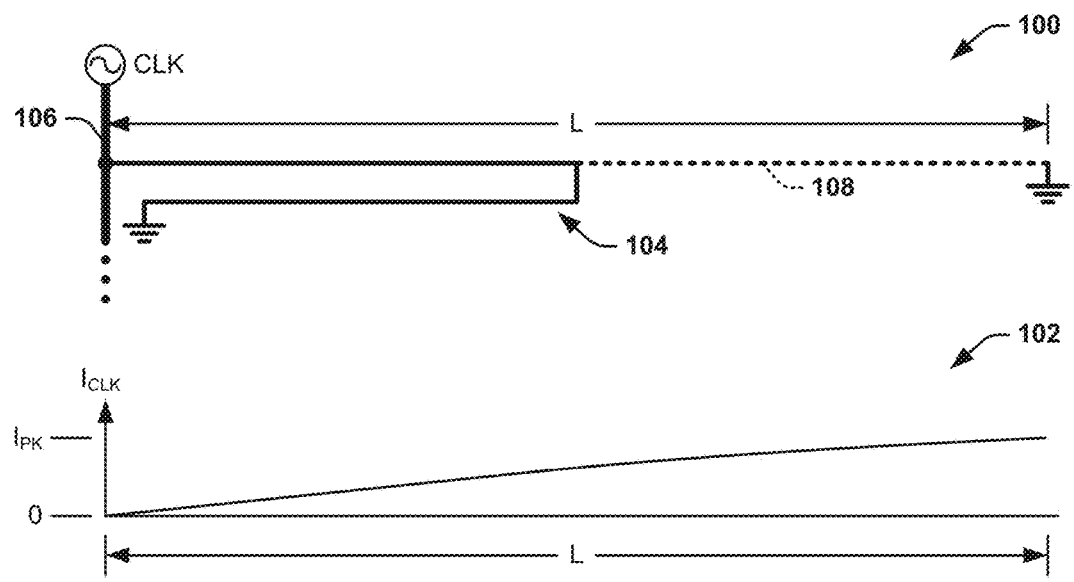
FIG. 3 illustrates an example of a resonator system and a graph of current.

FIG. 3 illustrates an example of a resonator system 100 and a graph 102 of clock current $I_{CLK}$. The resonator system 100 can correspond to a portion of the resonator spine 54 and one of the resonator ribs 56 in the example of FIG. 2. Particularly, in the example of FIG. 3, the resonator system 100 includes a resonator rib 104 that is conductively coupled to a resonator spine 106 and which includes a grounded end opposite the conductive coupling to the resonator spine 106. The resonator rib 104 is demonstrated as both including bends and as fully extended to the length "L" as demonstrated by the dotted line 108. Thus, the length "L" is representative of a full length of the resonator rib 104 if the resonator rib 104 was fully extended in a linear, unbent manner.

The graph 102 demonstrates an amplitude of the clock current $I_{CLK}$ as a function of the length "L" of the resonator rib 104. The length "L" of the graph 102 corresponds directly to the length "L" of the fully extended, linear resonator rib 104 demonstrated by the dotted line 108. Therefore, the length "L" in the graph 102 extends from the conductive coupling of the resonator rib 104 to the resonator spine 106 and along the length of the resonator rib 104 to the grounded end. As demonstrated in the example of FIG. 3, the clock current $I_{CLK}$ increases along the length "L" from left to right, and thus from the conductive coupling of the resonator rib 104 to the resonator spine 106 and along the length of the resonator rib 104 to the grounded end. Particularly, the clock current $I_{CLK}$ increases from approximately zero amperes at the left, at the conductive coupling of the resonator rib 104 to the resonator spine 106, to an amplitude $I_{PK}$ at the grounded end. The increase of the amplitude of the clock current $I_{CLK}$ from zero to the amplitude $I_{PK}$ may not be linear, but could instead be a sinusoidal increase. As an example, the relationship between the amplitude of the current and the position along the length of a given resonator rib can be approximately sinusoidal, reaching a maximum amplitude where the rib is connected to ground. Accordingly, the graph 102 demonstrates that the clock current $I_{CLK}$ is non-uniform along the length of the resonator rib 104.

Figure 4:
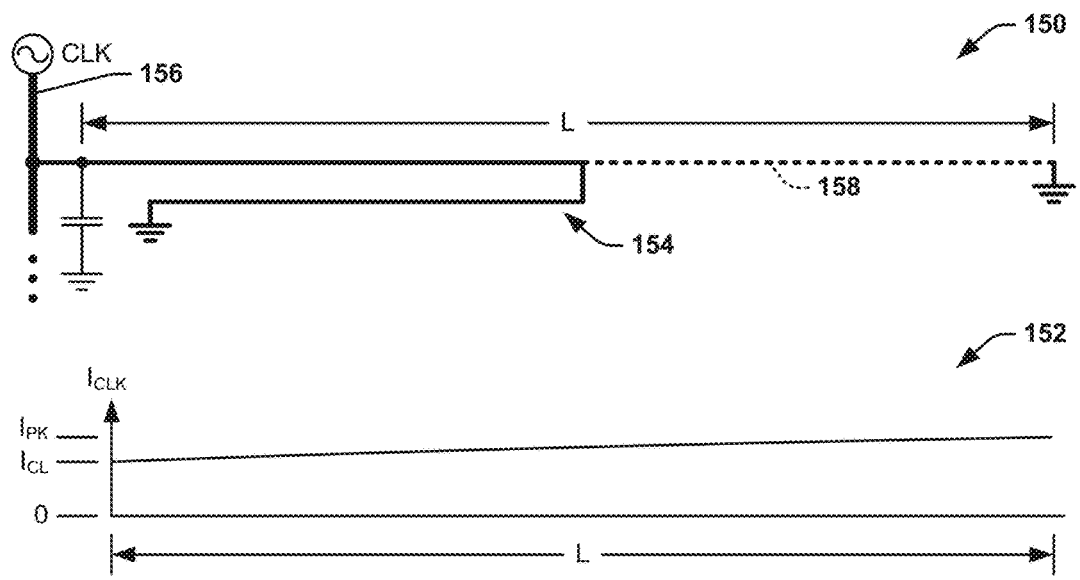
FIG. 4 illustrates another example of a resonator system and a graph of current.

FIG. 4 illustrates another example of a resonator system 150 and a graph 152 of clock current $I_{CLK}$. The resonator system 150 can correspond to a portion of the resonator spine 54 and one of the resonator ribs 56 in the example of FIG. 2. Particularly, in the example of FIG. 4, the resonator system 150 includes a resonator rib 154 that is conductively coupled to a resonator spine 156 and which includes a grounded end opposite the conductive coupling to the resonator spine 156. The resonator rib 154 is demonstrated as both including bends and as fully extended to the length "L" as demonstrated by the dotted line 158. Thus, the length "L" is representative of a full length of the resonator rib 154 if the resonator rib 154 was fully extended in a linear, unbent manner. Thus, in the example of FIG. 4, the resonator system 150 is substantially similar to the resonator system 100 in the example of FIG. 3. However, the resonator system 150 further includes a capacitive load, demonstrated as a capacitor $C_1$, that is coupled to the end of the resonator rib 154 that is conductively coupled to the resonator spine 156.

The graph 152 demonstrates an amplitude of the clock current $I_{CLK}$ as a function of the length "L" of the resonator rib 154. The length "L" of the graph 152 corresponds directly to the length "L" of the fully extended, linear resonator rib 154 demonstrated by the dotted line 158. Therefore, the length "L" in the graph 152 extends from the conductive coupling of the resonator rib 154 to the resonator spine 156, at approximately the capacitor $C_1$, and along the length of the resonator rib 154 to the grounded end. As demonstrated in the example of FIG. 4, the clock current $I_{CLK}$ increases along the length "L" from left to right, and thus from the conductive coupling of the resonator rib 154 to the resonator spine 156 and along the length of the resonator rib 154 to the grounded end. Particularly, the clock current $I_{CLK}$ increases from an amplitude $I_{CL}$ at the left, at approximately the capacitor $C_1$, to the amplitude $I_{PK}$ at the grounded end. The increase of the amplitude of the clock current $I_{CLK}$ from the amplitude $I_{CL}$ to the amplitude $I_{PK}$ may not be linear, but could instead be an exponential (e.g., root exponent) increase. Therefore, in the example of FIG. 4, the clock current $I_{CLK}$ does not vary along the length "L" as significantly as the variation of the clock current $I_{CLK}$ in the example of FIG. 3 along the length "L".

As described previously, based on the bends of the resonator ribs, the additive manner of the inductive generation of the clock currents $I_{CLK}$ can be such that each of the clock current $I_{CLK}$ can be approximately uniform with respect to the circuits arranged along the resonator ribs. FIGS. 5-18 demonstrate multiple examples of different configurations of resonator systems. In each of the different configurations, the associated circuit and opposing grounded end of each of the transformer-coupling lines is not demonstrated for the sake of simplicity. However, it is to be understood that in each of the following examples of FIGS. 5-18, each of the transformer-coupling lines is configured to inductively generate a clock current $I_{CLK}$ that is provided to an associated circuit to facilitate functions associated with the associated circuit.

Figure 5:
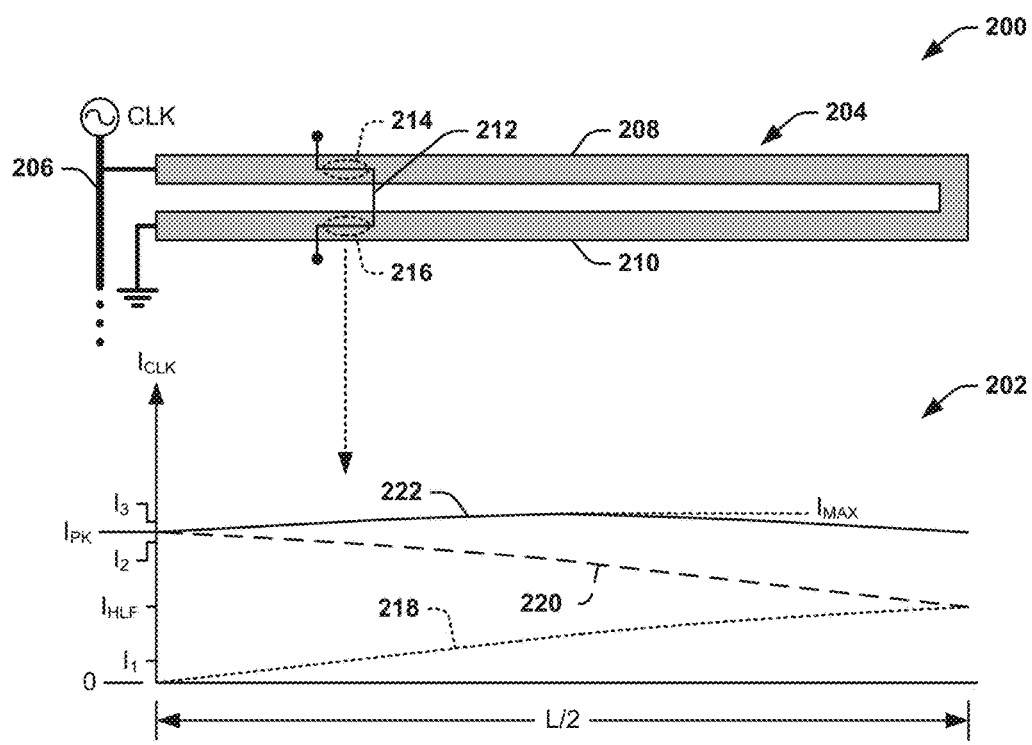
FIG. 5 illustrates yet another example of a resonator system and a graph of current.

FIG. 5 illustrates yet another example of a resonator system 200 and a graph 202 of clock current $I_{CLK}$. The resonator system 200 can correspond to a portion of the resonator spine 54 and one of the resonator ribs 56 in the example of FIG. 2. Particularly, in the example of FIG. 5, the resonator system 200 includes a resonator rib 204 that is conductively coupled to a resonator spine 206 and which includes a grounded end opposite the conductive coupling to the resonator spine 206. The resonator rib 204 is demonstrated as including bends to be arranged as including a first parallel portion 208 that is conductively coupled to the resonator spine 206 and a second parallel portion 210 that has a grounded end.

The resonator system 200 also demonstrates a transformer-coupling line 212 that is demonstrated as being inductively coupled to the resonator rib 204 via a first inductive coupling 214 to the first parallel portion 208 and a second inductive coupling 216 to the second parallel portion 210. As an example, the transformer-coupling line 212 can be grounded at one end and coupled to an associated circuit (not shown) at an opposing end, as described previously. In the example of FIG. 5, the parallel portions 208 and 210 are each demonstrated as having a thickness that is greater than the thickness of the transformer-coupling line 212. It is to be understood that the thicknesses of the transformer-coupling line 212 and the parallel portions 208 and 210 are not necessarily intended to be in scale in the example of FIG. 5. As an example, the parallel portions 208 and 210 can have a thickness that is approximately 125% of the thickness of the transformer-coupling line 212. However, as demonstrated in greater detail herein, the relative thicknesses of the transformer-coupling line 212 and the parallel portions 208 and 210 can vary based on the number and location of the inductive couplings between the transformer-coupling line 212 and the parallel portions 208 and 210.

The graph 202 demonstrates an amplitude of the clock current $I_{CLK}$ as a function of the length "L/2" of the resonator rib 204. The length "L/2" of the graph 202 corresponds directly to approximately half the length "L" of the resonator rib 204 if fully extended. Therefore, the length "L/2" in the graph 202 extends from the conductive coupling of the resonator rib 204 to the resonator spine 206 and along approximately half the length of the resonator rib 204, at approximately the bends, and again from approximately the bends along the length of the resonator rib 204 to the grounded end (from right to left). Similar to as described in the examples of FIGS. 2-4, the clock current $I_{CLK}$ increases along the length of the resonator rib 204. As demonstrated in the example of FIG. 5, the clock current $I_{CLK}$ increases along the length "L/2" from left to right along the first parallel portion 208, and thus from the conductive coupling of the resonator rib 204 to the resonator spine 206 and along the length of the resonator rib 204 to approximately the bends, as demonstrated by a dotted line 218. Particularly, the clock current $I_{CLK}$ increases from approximately zero amperes at the left, at the conductive coupling of the resonator rib 204 to the resonator spine 206, to an amplitude $I_{HLF}$ at approximately the bends (e.g., approximately half the length of the resonator rib 204) along the dotted line 218. The clock current $I_{CLK}$ also increases along the length "L/2" from right to left along the second parallel portion 210, and thus from approximately the bends to the grounded end, as demonstrated by a dashed line 220. Particularly, the clock current $I_{CLK}$ increases from approximately the amplitude $I_{HLF}$ at the right, at approximately the bends, to the amplitude $I_{PK}$ at approximately the grounded end along the dashed line 220.

The graph 202 also provides an amplitude of a summation current, demonstrated as a solid line 222, that is representative of a sum of the clock currents $I_{CLK}$ along the length of the respective parallel portions 208 and 210. Particularly, the summation current 222 varies in amplitude from approximately the amplitude $I_{PK}$ to a maximum amplitude $I_{MAX}$ that is approximately half the length of the length "L/2" (i.e., approximately one quarter a total length "L" of the resonator rib 204). However, because the clock current $I_{CLK}$ varies across the length "L/2" of each of the parallel portions 208 and 210, and because such variation increases in opposing directions with respect to the parallel portions 208 and 210, the summation current 222 can have a small variation in amplitude between the amplitude $I_{PK}$ and the amplitude $I_{MAX}$ (e.g., approximately 8-20% amplitude variation).

As described previously, the additive manner of the inductive generation of the clock current $I_{CLK}$ via the respective multiple inductive couplings 214 and 216 can be such that the clock current $I_{CLK}$ can be approximately uniform with respect to a location of the transformer-coupling line 212 along the length "L/2" of the resonator rib 204. In the example of FIG. 5, the first inductive coupling 214 can provide an amplitude $I_1$ (e.g., on the dotted line 218) as a portion of the total clock current $I_{CLK}$, and the second inductive coupling 216 can provide an amplitude $I_2$ (e.g., on the dashed line 220) as a portion of the total clock current $I_{CLK}$. Therefore, the sum of the amplitudes $I_1$ and $I_2$ can be the amplitude $I_3$ on the summation current 222, such that the amplitude $I_3$ corresponds to a total amplitude of the clock current $I_{CLK}$ corresponding to the clock signal CLK based on the inductive coupling (i.e., via the inductive couplings 214 and 216) of the transformer-coupling line 212 to the resonator rib 204. Accordingly, shifting the lateral position of the transformer-coupling line 212 along the length "L/2" of the resonator rib 204 results in a small change in the amplitude of the summation current 222, and thus the clock current $I_{CLK}$. As a result, multiple transformer-coupling lines 212 that are arranged along the length "L/2" of the resonator rib 204 can be approximately uniform with respect to the amplitude of the clock current $I_{CLK}$ that is provided to respective associated circuits. Thus, the clock signal CLK can be distributed to the respective circuits across the associated IC chip in a manner that substantially mitigates non-uniformity of the respective clock current $I_{CLK}$ based on the multiple inductive couplings of the transformer-coupling line 212 to the resonator rib 204.

Figure 6:
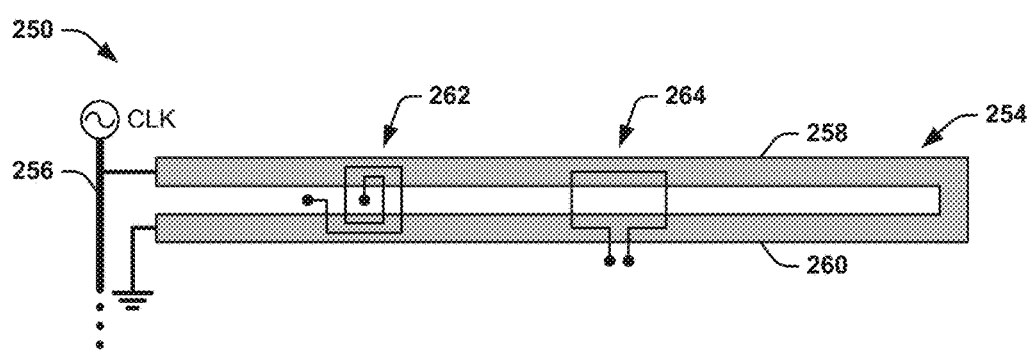
FIG. 6 illustrates another example of a resonator system.

As described previously, there can be a multitude of different configurations of the resonator rib(s) and resonator spine(s), as well as how the transformer-coupling line(s) can be inductively coupled to the respective resonator rib(s). FIG. 6 illustrates another example of a resonator system 250. The resonator system 250 can correspond to a portion of the resonator spine 54 and one of the resonator ribs 56 in the example of FIG. 2. Particularly, in the example of FIG. 6, the resonator system 250 includes a resonator rib 254 that is conductively coupled to a resonator spine 256 and which includes a grounded end opposite the conductive coupling to the resonator spine 256. The resonator rib 254 is demonstrated as including bends to be arranged as including a first parallel portion 258 that is conductively coupled to the resonator spine 256 and a second parallel portion 260 that has a grounded end.

The resonator system 250 also demonstrates a first transformer-coupling line 262 that is demonstrated as being inductively coupled to the resonator rib 254 via multiple inductive couplings. Particularly, the first transformer-coupling line 262 is arranged as a spiral between opposing ends of the first transformer-coupling line 262. Therefore, in the example of FIG. 6, two of the inductive-coupling portions of the first transformer-coupling line 262 are each inductively coupled in parallel to a same portion of the respective resonator rib 254. Particularly, the first transformer-coupling line 262 includes four separate inductive couplings to the resonator rib 254. Thus, two of the inductive couplings are arranged in parallel along a portion of the first parallel portion 258 of the resonator rib 254, and another two of the inductive couplings are arranged in parallel along a portion of the second parallel portion 260 of the resonator rib 254. As a result, each of the four inductive couplings are provided via a respective four inductive-coupling portions of the transformer-coupling line 262 to inductively generate the clock current $I_{CLK}$ in an additive manner (e.g., via a sum of contributions to the clock current $I_{CLK}$ from the four inductive-coupling portions). The inductive-coupling portions of the transformer-coupling line 262 are located at approximately the same distance along the length "L/2" of the parallel portions 258 and 260. Accordingly, multiple transformer-coupling lines 262 that are arranged along the length "L/2" of the resonator rib 254 can be approximately uniform with respect to the amplitude of the clock current $I_{CLK}$ that is provided to respective associated circuits.

The resonator system 250 also demonstrates a second transformer-coupling line 264 that is demonstrated as being inductively coupled to the resonator rib 254 via multiple inductive couplings. Particularly, the second transformer-coupling line 264 is arranged as a substantially enclosed rectangle (e.g., a "loop"), such that a pair of the inductive-coupling portions of the second transformer-coupling line 264 that are each coupled proximal to a respective pair of ends of the second transformer-coupling line 264 is inductively coupled to a same one of the parallel portions of the resonator rib 254. Therefore, in the example of FIG. 6, one of the inductive-coupling portions of the second transformer-coupling line 264 is inductively coupled to the first parallel portion 258, and two other inductive-coupling portions of the second transformer-coupling line 264 are coupled along the second parallel portion 260 of the resonator rib 254. Particularly, the second transformer-coupling line 264 includes three separate inductive couplings to the resonator rib 254. As a result, each of the three inductive couplings are provided via the respective three inductive-coupling portions of the second transformer-coupling line 264 to inductively generate the clock current $I_{CLK}$ in an additive manner (e.g., via a sum of contributions to the clock current $I_{CLK}$ from the three inductive-coupling portions). The inductive-coupling portions of the second transformer-coupling line 264 are located at approximately the same distance along the length "L/2" of the parallel portions 258 and 260. Additionally, the combined length of the inductive-coupling portions of the transformer-coupling line 264 that are inductively coupled to the second parallel portion 260 is approximately equal to a length of the inductive-coupling portion that is inductively coupled to the first parallel portion 258 to provide an approximately equal mutual inductance with respect to the inductive coupling to the parallel portions 258 and 260. Accordingly, multiple transformer-coupling lines 264 that are arranged along the length "L/2" of the resonator rib 254 can be approximately uniform with respect to the amplitude of the clock current $I_{CLK}$ that is provided to respective associated circuits.

Figure 7:
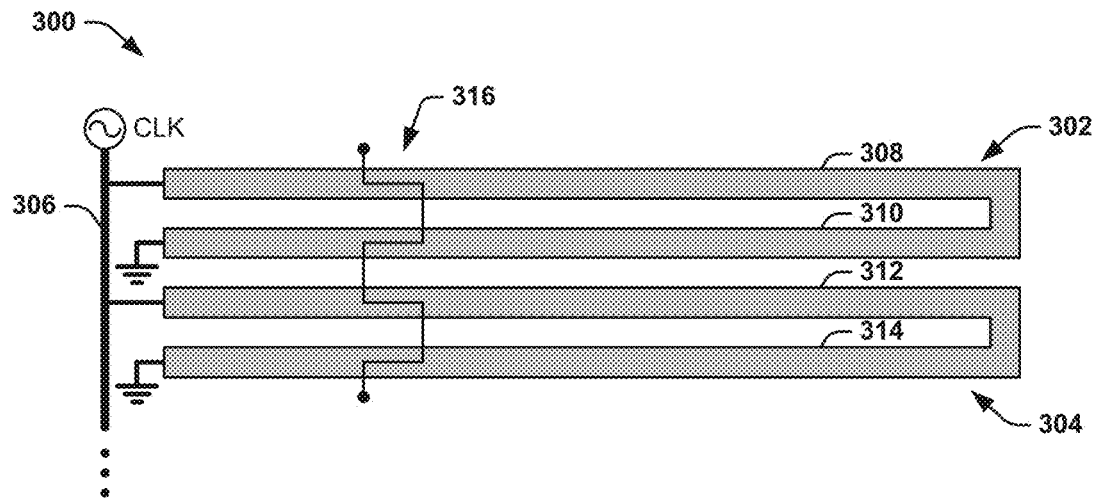
FIG. 7 illustrates another example of a resonator system.

FIG. 7 illustrates another example of a resonator system 300. The resonator system 300 can correspond to a portion of the resonator spine 54 and two of the resonator ribs 56 in the example of FIG. 2. Particularly, in the example of FIG. 7, the resonator system 300 includes a first resonator rib 302 that is conductively coupled to a resonator spine 306 and which includes a grounded end opposite the conductive coupling to the resonator spine 306, and further includes a second resonator rib 304 that is conductively coupled to the resonator spine 306 and which likewise includes a grounded end opposite the conductive coupling to the resonator spine 306. The first resonator rib 302 is demonstrated as including bends to be arranged as including a first parallel portion 308 that is conductively coupled to the resonator spine 306 and a second parallel portion 310 that has a grounded end. Similarly, the second resonator rib 304 is demonstrated as including bends to be arranged as including a first parallel portion 312 that is conductively coupled to the resonator spine 306 and a second parallel portion 314 that has a grounded end. Therefore, the first and second resonator ribs 302 and 304 are arranged approximately identically with respect to each other.

The resonator system 300 also demonstrates a transformer-coupling line 316 that is demonstrated as being inductively coupled to each of the resonator ribs 302 and 304 via multiple inductive couplings. Particularly, the transformer-coupling line 316 is inductively coupled to the first resonator rib 302 via a first inductive coupling to the first parallel portion 308 and via a second inductive coupling to the second parallel portion 310. The transformer-coupling line 316 is also inductively coupled to the second resonator rib 304 via a third inductive coupling to the first parallel portion 312 and via a fourth inductive coupling to the second parallel portion 314. As a result, each of the four inductive couplings are provided via a respective four inductive-coupling portions of the transformer-coupling line 316 to inductively generate the clock current $I_{CLK}$ in an additive manner (e.g., via a sum of contributions to the clock current $I_{CLK}$ from the four inductive-coupling portions). The inductive-coupling portions of the transformer-coupling line 316 are located at approximately the same distance along the length "L/2" of the parallel portions 308 and 310 and the parallel portions 312 and 314. Accordingly, multiple transformer-coupling lines 316 that are arranged along the length "L/2" of the resonator ribs 302 and 304 can be approximately uniform with respect to the amplitude of the clock current $I_{CLK}$ that is provided to respective associated circuits.

Figure 8:
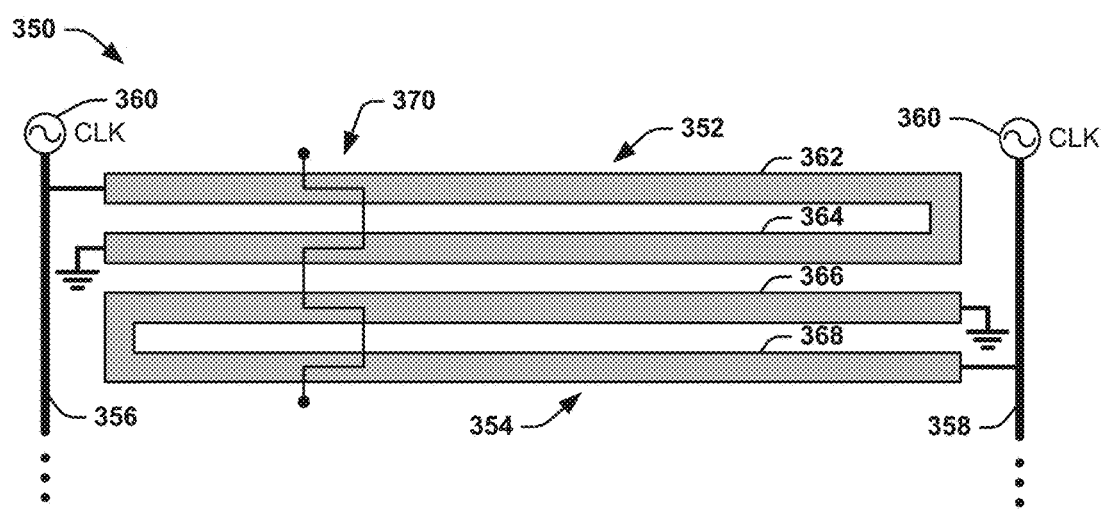
FIG. 8 illustrates another example of a resonator system.

FIG. 8 illustrates another example of a resonator system 350. The resonator system 350 can correspond to a portion of the resonator spine 54 and two of the resonator ribs 56 in the example of FIG. 2. Particularly, in the example of FIG. 8, the resonator system 350 includes a first resonator rib 352 that is conductively coupled to a first resonator spine 356 and which includes a grounded end opposite the conductive coupling to the first resonator spine 356, and further includes a second resonator rib 354 that is conductively coupled to a second resonator spine 358 and which likewise includes a grounded end opposite the conductive coupling to the second resonator spine 358. Each of the first and second resonator spines 356 and 358 are demonstrated as propagating the clock signal CLK from respective signal sources 360. As an example, the signal sources 360 can correspond to the same signal source, or could be different signal sources that each provides the clock signal CLK. As another example, the first and second resonator spines 356 and 358 could correspond to the same resonator spine that propagates the clock signal CLK.

The first resonator rib 352 is demonstrated as including bends to be arranged as including a first parallel portion 362 that is conductively coupled to the resonator spine 356 and a second parallel portion 364 that has a grounded end. Similarly, the second resonator rib 354 is demonstrated as including bends to be arranged as including a first parallel portion 366 that is conductively coupled to the resonator spine 356 and a second parallel portion 368 that has a grounded end. Therefore, the first and second resonator ribs 352 and 354 are arranged approximately identically with respect to each other. However, in the example of FIG. 8, the first and second resonator ribs 352 and 354 are demonstrated as being arranged in an anti-parallel arrangement with each other, in that the first and second resonator ribs 352 and 354 are arranged opposite each other with respect to the orientation from coupling to the respective one of the resonator spines 356 and 358 to the respective grounded ends.

The resonator system 350 also demonstrates a transformer-coupling line 370 that is demonstrated as being inductively coupled to each of the resonator ribs 352 and 354 via multiple inductive couplings. Particularly, the transformer-coupling line 370 is inductively coupled to the first resonator rib 352 via a first inductive coupling to the first parallel portion 362 and via a second inductive coupling to the second parallel portion 364. The transformer-coupling line 370 is also inductively coupled to the second resonator rib 354 via a third inductive coupling to the first parallel portion 366 and via a fourth inductive coupling to the second parallel portion 368. As a result, each of the four inductive couplings are provided via a respective four inductive-coupling portions of the transformer-coupling line 370 to inductively generate the clock current $I_{CLK}$ in an additive manner (e.g., via a sum of contributions to the clock current $I_{CLK}$ from the four inductive-coupling portions). Additionally, based on the anti-parallel orientation of the first and second resonator ribs 352 and 354, the transformer-coupling line 370 can have the same alternating orientation as the transformer-coupling line 316 in the example of FIG. 7, and still inductively generate the clock current $I_{CLK}$ in an additive manner. The inductive-coupling portions of the transformer-coupling line 370 are located at approximately the same distance along the length "L/2" of the parallel portions 362 and 364 and the parallel portions 366 and 368. Accordingly, multiple transformer-coupling lines 370 that are arranged along the length "L/2" of the resonator ribs 352 and 354 can be approximately uniform with respect to the amplitude of the clock current $I_{CLK}$ that is provided to respective associated circuits.

Figure 9:
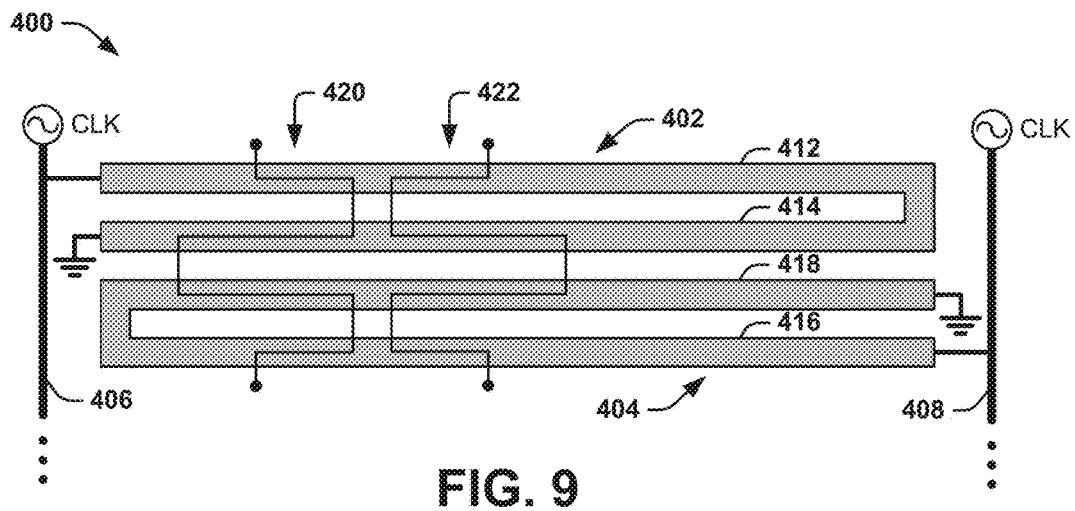
FIG. 9 illustrates another example of a resonator system.

FIG. 9 illustrates another example of a resonator system 400. The resonator system 400 can correspond to a portion of the resonator spine 54 and two of the resonator ribs 56 in the example of FIG. 2. The resonator system 400 in the example of FIG. 9 is arranged substantially similar to the resonator system 350 in the example of FIG. 8. Particularly, the resonator system 400 includes a first resonator rib 402 that is conductively coupled to a first resonator spine 406 and a second resonator rib 404 that is conductively coupled to a second resonator spine 408. Each of the first and second resonator ribs 402 and 404 include bends, such that the first resonator rib 402 includes a first parallel portion 412 and a second parallel portion 414, and the second resonator rib 404 includes a first parallel portion 416 and a second parallel portion 418. Therefore, the first and second resonator ribs 402 and 404 are arranged approximately identically with respect to each other, but are arranged anti-parallel with respect to each other, similar to as described previously in the example of FIG. 8.

The resonator system 400 also demonstrates a first transformer-coupling line 420 and a second transformer-coupling line 422 that are each demonstrated as being inductively coupled to each of the resonator ribs 402 and 404 via multiple inductive couplings. Particularly, the transformer-coupling lines 420 and 422 are inductively coupled to the first resonator rib 402 via a first inductive coupling to the first parallel portion 412 and via a second inductive coupling to the second parallel portion 414. The transformer-coupling lines 420 and 422 are also inductively coupled to the second resonator rib 404 via a third inductive coupling to the first parallel portion 416 and via a fourth inductive coupling to the second parallel portion 418. However, the transformer-coupling lines 420 and 422 are demonstrated as having non-uniform lengths with respect to the inductive-coupling portions of the transformer-coupling lines 420 and 422.

Particularly, in the example of FIG. 9, the inductive-coupling portions of the transformer-coupling lines 420 and 422 that are coupled to the second parallel portions 414 and 418 of the respective resonator ribs 402 and 404 are longer than the inductive-coupling portions of the transformer-coupling line 420 that are coupled to the second parallel portions 414 and 418 of the respective resonator ribs 402 and 404. Additionally, the transformer-coupling lines 420 and 422 are demonstrated in opposite (e.g., mirror-image) arrangements with respect to each other. As a result, the greater inductance of the respective longer inductive-coupling portions can result in a greater amplitude of the clock current $I_{CLK}$. Therefore, the resonator system 400 demonstrates that the length of the inductive-coupling portions of the transformer-coupling lines can be designed to provide desired amplitudes of the clock current $I_{CLK}$ while still providing substantial uniformity with respect to the amplitude of the clock current $I_{CLK}$ that is provided to respective associated circuits across the transformer-coupling lines.

Additionally, as an example, providing shorter lengths with respect to some of the inductive-coupling portions of the transformer-coupling lines 420 and 422 (e.g., with respect to the first parallel portions 412 and 416) can provide a geometrical advantage. As an example, the coupling of transformer-coupling lines 420 and 422 can be provided in pairs with opposite-phase AC coupling to resonator ribs. Thus, in the example of FIG. 9, the transformer-coupling lines 420 and 422 are arranged in a mirror-image arrangement. As such, the response of the transformer-coupling lines 420 and 422 are 180° out-of-phase relative to each other. The transformer-coupling lines 420 and 422 can share other layout features, as well. In addition, while the shorter lengths of the transformer-coupling lines 420 and 422 may have a reduced inductive coupling the respective first parallel portions 412 and 416, the respective first parallel portions conduct a smaller amount of current relative to the respective second parallel portions 414 and 418. Therefore, the inductive coupling loss is small and can be compensated by the ease with which the transformer-coupling lines 420 and 422 of opposite phase are fabricated.

Figure 10:
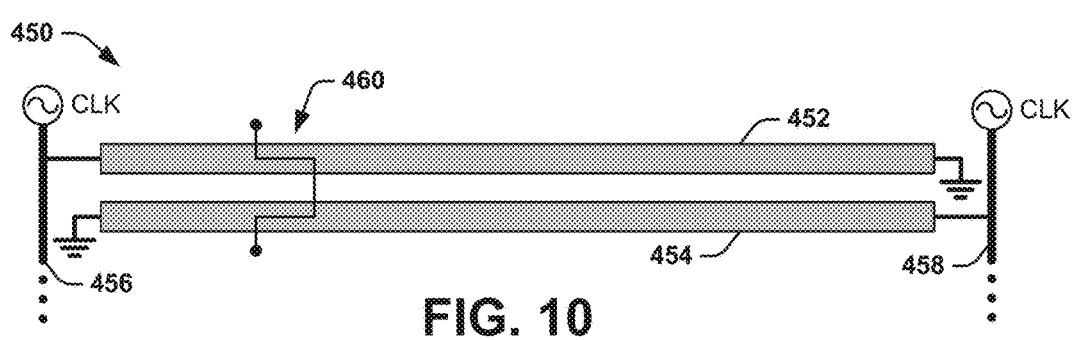
FIG. 10 illustrates another example of a resonator system.

FIG. 10 illustrates another example of a resonator system 450. The resonator system 450 can correspond to a portion of the resonator spine 54 and two of the resonator ribs 56 in the example of FIG. 2. The resonator system 450 in the example of FIG. 10 is arranged substantially similar to the resonator system 350 in the example of FIG. 8. Particularly, the resonator system 450 includes a first resonator rib 452 that is conductively coupled to a first resonator spine 456 and a second resonator rib 454 that is conductively coupled to a second resonator spine 458. However, the first and second resonator ribs 452 and 454 do not include bends, and are instead demonstrated as having a linear extension arrangement. Therefore, the first resonator rib 452 and the second resonator rib 454 correspond to respective parallel portions. Similar to as demonstrated in the examples of FIGS. 8 and 9, the first and second resonator ribs 452 and 454 are arranged anti-parallel with respect to each other.

The resonator system 450 also demonstrates a transformer-coupling line 460 that is demonstrated as being inductively coupled to each of the resonator ribs 452 and 454 via respective inductive couplings. Particularly, the transformer-coupling line 460 is inductively coupled to the first resonator rib 452 via a first inductive coupling and to the second resonator rib 454 via a second inductive coupling. Similar to as described previously in the example of FIG. 8, based on the anti-parallel orientation of the first and second resonator ribs 452 and 454, the transformer-coupling line 460 can have the same alternating orientation as the transformer-coupling line 212 in the example of FIG. 5, and still inductively generate the clock current $I_{CLK}$ in an additive manner. The inductive-coupling portions of the transformer-coupling line 460 are located at approximately the same distance along the length "L/2" of the opposite orientations of the first and second resonator ribs 452 and 454 (i.e., from the left). Accordingly, multiple transformer-coupling lines 460 that are arranged along the length "L/2" of the opposite orientations of the resonator ribs 452 and 454 can be approximately uniform with respect to the amplitude of the clock current $I_{CLK}$ that is provided to respective associated circuits.

Figure 11:
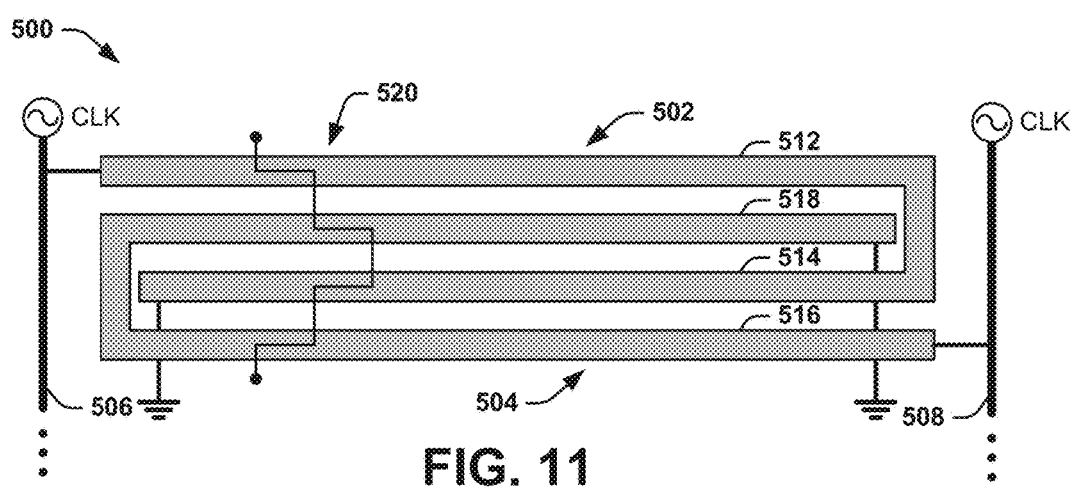
FIG. 11 illustrates another example of a resonator system.

FIG. 11 illustrates another example of a resonator system 500. The resonator system 500 can correspond to a portion of the resonator spine 54 and two of the resonator ribs 56 in the example of FIG. 2. The resonator system 500 in the example of FIG. 11 is arranged substantially similar to the resonator system 350 in the example of FIG. 8. Particularly, the resonator system 500 includes a first resonator rib 502 that is conductively coupled to a first resonator spine 506 and a second resonator rib 504 that is conductively coupled to a second resonator spine 508. Each of the first and second resonator ribs 502 and 504 include bends, such that the first resonator rib 502 includes a first parallel portion 512 and a second parallel portion 514, and the second resonator rib 504 includes a first parallel portion 516 and a second parallel portion 518. However, in the example of FIG. 11, the first and second resonator ribs 502 and 504 are arranged in an interleaved anti-parallel configuration respect to each other. Particularly, the second parallel portion 518 of the second resonator rib 504 is arranged between the parallel portions 512 and 514 of the first resonator rib 502, and the second parallel portion 514 of the first resonator rib 502 is arranged between the parallel portions 516 and 518 of the second resonator rib 504.

The resonator system 500 also demonstrates a transformer-coupling line 520 that is demonstrated as being inductively coupled to each of the resonator ribs 502 and 504 via multiple inductive couplings. Particularly, the transformer-coupling line 520 is inductively coupled to the first resonator rib 502 via a first inductive coupling to the first parallel portion 512 and via a second inductive coupling to the second parallel portion 514. The transformer-coupling line 520 is also inductively coupled to the second resonator rib 504 via a third inductive coupling to the first parallel portion 516 and via a fourth inductive coupling to the second parallel portion 518. Additionally, based on the anti-parallel orientation of the first and second resonator ribs 502 and 504, the transformer-coupling line 520 can have the same alternating orientation as the transformer-coupling line 316 in the example of FIG. 7, and still inductively generate the clock current $I_{CLK}$ in an additive manner. In the example of FIG. 11, the inductive-coupling portions of the transformer-coupling line 520 are not located at the same distances along the length "L/2" of the parallel portions 512 and 514 and the parallel portions 516 and 518. However, the inductive-coupling portions of the transformer-coupling line 520 are located at similar distances along the length "L/2" of the parallel portions 512 and 514 and the parallel portions 516 and 518, and the relative length of the parallel portions 512 and 514 can be significantly longer than the length of the inductive-coupling portions of the transformer-coupling line 520 (e.g., approximately 5-25 µm for an inductive-coupling portion relative to several millimeters for a parallel portion of a resonator rib). Accordingly, multiple transformer-coupling lines 520 that are arranged along the length "L/2" of the resonator ribs 502 and 504 can have substantial uniformity with respect to the amplitude of the clock current $I_{CLK}$ that is provided to respective associated circuits.

Figure 12:
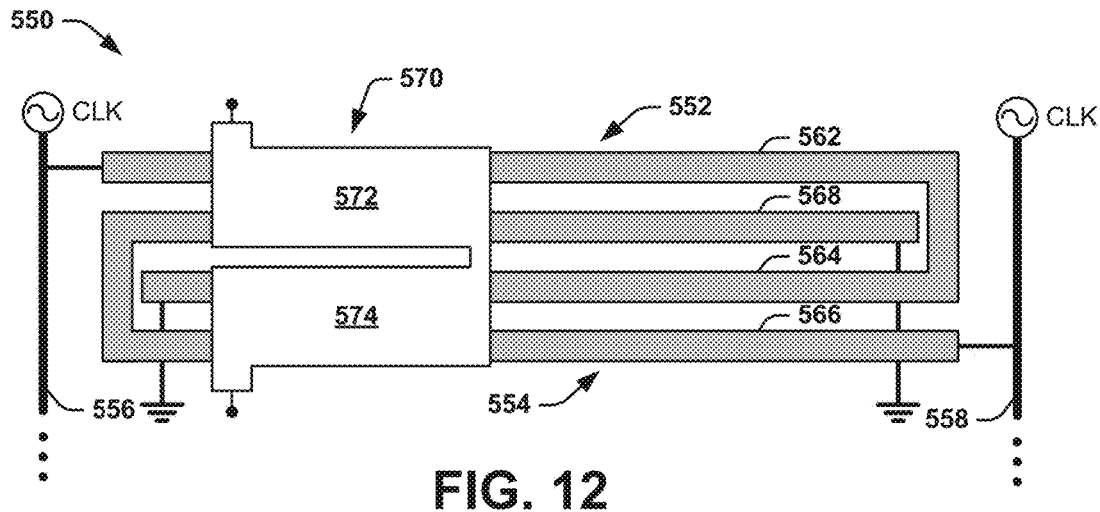
FIG. 12 illustrates another example of a resonator system.

FIG. 12 illustrates another example of a resonator system 550. The resonator system 550 can correspond to a portion of the resonator spine 54 and two of the resonator ribs 56 in the example of FIG. 2. The resonator system 550 in the example of FIG. 12 is arranged substantially similar to the resonator system 350 in the example of FIG. 11. Particularly, the resonator system 550 includes a first resonator rib 552 that is conductively coupled to a first resonator spine 556 and a second resonator rib 554 that is conductively coupled to a second resonator spine 558. Each of the first and second resonator ribs 552 and 554 include bends, such that the first resonator rib 552 includes a first parallel portion 562 and a second parallel portion 564, and the second resonator rib 554 includes a first parallel portion 566 and a second parallel portion 568. Additionally, similar to the example of FIG. 11, the first and second resonator ribs 552 and 554 are arranged in an interleaved anti-parallel configuration respect to each other.

The resonator system 550 also demonstrates a transformer-coupling line 570 that is demonstrated as being inductively coupled to each of the resonator ribs 552 and 554 via multiple inductive couplings. However, the transformer-coupling line 570 is demonstrated as having inductive-coupling portions that are thicker in pitch than the resonator ribs 552 and 554. Particularly, in the example of FIG. 12, the transformer-coupling line 570 includes a first inductive-coupling portion 572 that is inductively coupled to both the first parallel portion 566 of the second resonator rib 554 and the second parallel portion 564 of the first resonator rib 552. The transformer-coupling line 570 also includes a second inductive-coupling portion 574 that is inductively coupled to both the first parallel portion 562 of the first resonator rib 552 and the second parallel portion 568 of the second resonator rib 554. Therefore, each of the inductive-coupling portions 572 and 574 is inductively coupled to each of the resonator ribs 552 and 554. While the example of FIG. 12 demonstrates that the inductive-coupling portions 572 and 574 are thicker in pitch than the resonator ribs 552 and 554, it is to be understood that the relative pitch thickness of the inductive-coupling portions 572 and 574 and the resonator ribs 552 and 554 can vary relative to each other to provide the multiple resonator rib inductive coupling to a single one of the inductive-coupling portions 572 and 574. For example, the inductive-coupling portions 572 and 574 can be interleaved with the resonator ribs 552 and 554 on the same layer of the IC chip.

Additionally, based on the anti-parallel orientation of the first and second resonator ribs 552 and 554, the inductive-coupling portions 572 and 574 of the transformer-coupling line 570 can have an alternating orientation to inductively generate the clock current $I_{CLK}$ in an additive manner. The inductive-coupling portions of the transformer-coupling line 570 are located at similar distances along the length "L/2" of the parallel portions 562 and 564 and the parallel portions 566 and 568. Accordingly, multiple transformer-coupling lines 570 that are arranged along the length "L/2" of the resonator ribs 552 and 554 can be approximately uniform with respect to the amplitude of the clock current $I_{CLK}$ that is provided to respective associated circuits.

Figure 13:
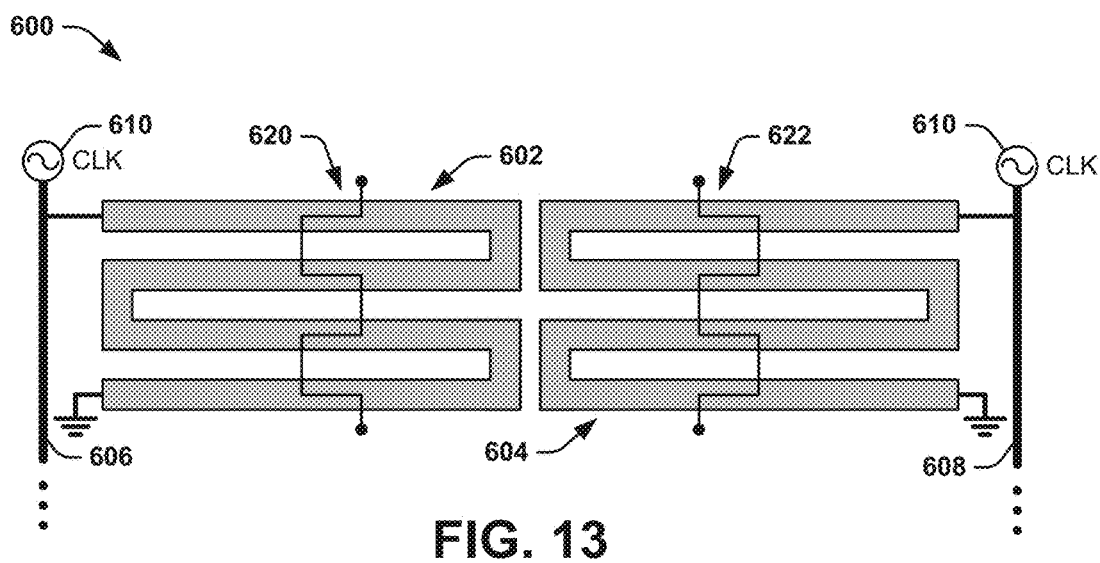
FIG. 13 illustrates another example of a resonator system.

FIG. 13 illustrates another example of a resonator system 600. The resonator system 600 can correspond to a portion of the resonator spine 54 and two of the resonator ribs 56 in the example of FIG. 2. Particularly, in the example of FIG. 13, the resonator system 600 includes a first resonator rib 602 that is conductively coupled to a first resonator spine 606 and which includes a grounded end opposite the conductive coupling to the first resonator spine 606, and further includes a second resonator rib 604 that is conductively coupled to a second resonator spine 608 and which likewise includes a grounded end opposite the conductive coupling to the second resonator spine 608. Each of the first and second resonator spines 606 and 608 are demonstrated as propagating the clock signal CLK from respective signal sources 610.

Each of the first and second resonator ribs 602 and 604 are demonstrated as including bends to be arranged as having more than two parallel portions. Particularly, in the example of FIG. 13, each of the first and second resonator ribs 602 and 604 include four separate parallel portions, with the first parallel portion being conductively coupled to the respective resonator spine 606 and 608 and the fourth parallel portion having a grounded end. Therefore, the first and second resonator ribs 602 and 604 are arranged approximately identically with respect to each other, and are a mirror-image with respect to each other.

The resonator system 600 also demonstrates a first transformer-coupling line 620 that is demonstrated as being inductively coupled to the resonator rib 602 and a second transformer-coupling line 622 that is demonstrated as being inductively coupled to the resonator rib 604. Particularly, the transformer-coupling lines 620 and 622 are each inductively coupled to each of the four parallel portions of the respective first and second resonator ribs 602 and 604. As a result, each of the four inductive couplings of each of the respective transformer-coupling lines 620 and 622 are provided via a respective four inductive-coupling portions of the transformer-coupling lines 620 and 622 to inductively generate the clock current $I_{CLK}$ in an additive manner (e.g., via a sum of contributions to the clock current $I_{CLK}$ from the four inductive-coupling portions). The inductive-coupling portions of the transformer-coupling lines 620 and 622 are located at approximately the same distance along the lengths of the four parallel portions of the respective resonator ribs 602 and 604. Accordingly, multiple transformer-coupling lines 620 that are arranged along the length of each of the resonator ribs 602 and 604 can be approximately uniform with respect to the amplitude of the clock current $I_{CLK}$ that is provided to respective associated circuits.

The example of FIG. 13 therefore demonstrates that a given resonator rib can have more than two parallel portions to facilitate inductively generating the clock current $I_{CLK}$ via the clock signal CLK. As an example, increasing the number of parallel portions can result in an even greater uniformity of the clock current $I_{CLK}$ that is inductively generated via each of the transformer-coupling lines 620 inductively coupled to a given one or more of the resonator ribs 620 and 622. As another example, the resonator spines of a given resonator system can be configured to provide separate clock signals, such as an in-phase clock signal and a quadrature-phase clock signal. As a result, multiple phase-shifts of the clock current $I_{CLK}$ can be provided based on a combination of different inductive couplings of the transformer-coupling line to the resonator ribs.

Figure 14:
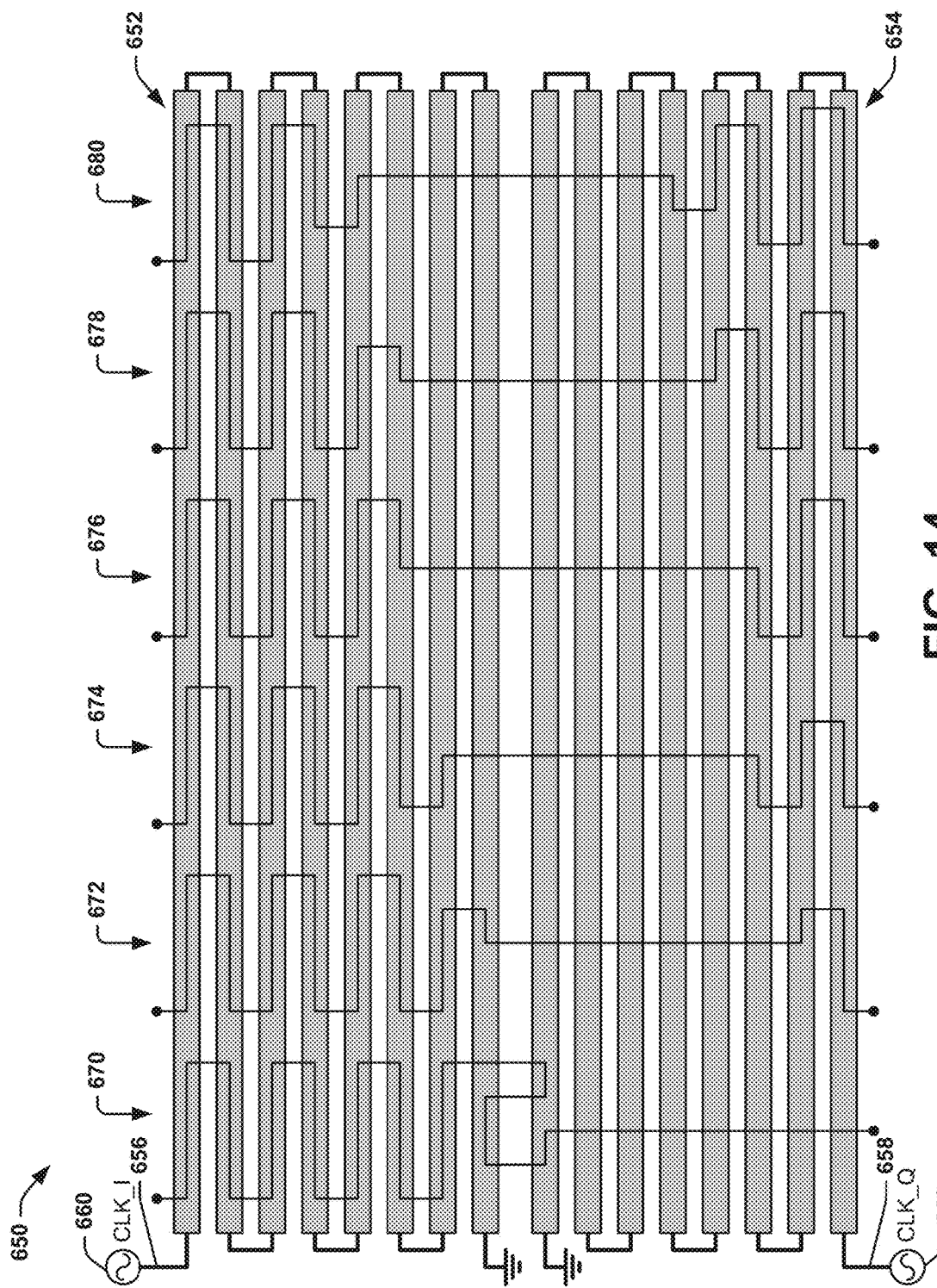
FIG. 14 illustrates another example of a resonator system.

FIG. 14 illustrates another example of a resonator system 650. The resonator system 650 can correspond to a portion of the resonator spine 54 and two of the resonator ribs 56 in the example of FIG. 2. Particularly, in the example of FIG. 14, the resonator system 650 includes a first resonator rib 652 that is conductively coupled to a first resonator spine 656 and which includes a grounded end opposite the conductive coupling to the first resonator spine 656. The first resonator spine 656 is configured to propagate an in-phase clock signal CLK_I via a signal source 660. The resonator system 650 also includes a second resonator rib 654 that is conductively coupled to a second resonator spine 658 and which likewise includes a grounded end opposite the conductive coupling to the second resonator spine 658. The second resonator spine 658 is configured to propagate a quadrature-phase clock signal CLK_Q via a signal source 662. The clock signals CLK_I and CLK_Q can thus have a phase-shift of 90° with respect to each other. In the example of FIG. 14, while each of the resonator ribs 652 and 654 are demonstrated as single resonator ribs with eight parallel portions, it is to be understood that the principles described herein are likewise applicable to multiple resonator ribs with less parallel portions that are coupled to the same resonator spine (e.g., two resonator ribs of four parallel portions similar as demonstrated in the example of FIG. 13, or four resonator ribs of two parallel portions similar to as demonstrated in the example of FIG. 7 or 8, or eight linear extension resonator ribs similar to as demonstrated in the example of FIG. 10, etc.).

Each of the first and second resonator ribs 652 and 654 are demonstrated as including bends to be arranged as having more than two parallel portions. Particularly, in the example of FIG. 14, each of the first and second resonator ribs 652 and 654 include eight separate parallel portions, with the first parallel portion being conductively coupled to the respective resonator spine 656 and 658 and the eighth parallel portion having a grounded end. Therefore, the first and second resonator ribs 652 and 654 are arranged approximately identically with respect to each other.

The resonator system 650 also demonstrates a plurality of transformer-coupling lines that are each arranged in different inductive-coupling arrangement with the resonator ribs 652 and 654 to provide different clock currents $I_{CLK}$. As an example, a first transformer-coupling line 670 is demonstrated as being inductively coupled to each of the parallel portions of the resonator rib 652, and is only slightly inductively coupled to one of the parallel portions of the resonator rib 654. In the example of FIG. 14, the inductive coupling of the transformer-coupling line 670 to the eighth parallel portion of the second resonator rib 654 is via two approximately equal-length opposite orientation inductive-coupling portions, demonstrated generally at 672. Based on the pair of opposite orientation inductive-coupling portions of the transformer-coupling line 670, the contribution of the inductive couplings with respect to the eighth parallel portion of the second resonator rib 654 to the inductive generation of the clock current $I_{CLK}$ is substantially cancelled. In other words, because the orientations of the inductive-coupling portions of the transformer-coupling line 670 are approximately equal and opposite, there is no net inductively provided contribution of the clock signal CLK_Q to the clock current $I_{CLK}$. As a result, the first transformer-coupling line 670 can provide a clock current $I_{CLK}$ that has an approximate 0° phase-shift relative to the in-phase clock signal CLK_I. The inductive coupling to the second resonator rib 654 in this example can be to demonstrate that each of the transformer-coupling lines in the example of FIG. 14 can be provided to have an approximately equal mutual-inductance with respect to the inductive couplings of the transformer-coupling lines to the resonator ribs 652 and 654 to maintain approximate uniformity of the clock currents $I_{CLK}$ associated with each of the respective transformer-coupling lines.

The resonator system 650 also a second transformer-coupling line 672 that is inductively coupled to each of the parallel portions of the resonator rib 652, and is inductively coupled to the first and second parallel portions of the resonator rib 654 (e.g., along various lengths of inductive-coupling portions). As a result, the second transformer-coupling line 672 inductively generates the respective clock current $I_{CLK}$ as having a large component of the in-phase clock signal CLK_I and a small component of the quadrature-phase clock signal CLK_Q. As a result, the contribution of the inductive coupling of the quadrature-phase clock signal CLK_Q can provide a phase-shift of the respective clock current $I_{CLK}$ relative to the in-phase clock signal CLK_I. As an example, the second transformer-coupling line 672 can have a phase-shift of approximately 9° relative to the in-phase clock signal CLK_I.

Accordingly, in the example of FIG. 14, the transformer-coupling lines are demonstrated as inductively coupled to a subset of the parallel portions of the first resonator rib 652 and to a subset of the second resonator rib 654 to inductively generate the clock current $I_{CLK}$ at a phase-shift relative to a phase of the in-phase clock signal CLK_I and a phase of the quadrature-phase clock signal CLK_Q. Particularly, the additional transformer-coupling lines are demonstrated as a transformer-coupling line 674, a transformer-coupling line 676, a transformer-coupling line 678, and a transformer-coupling line 680 that are each less successively inductively coupled to the first resonator rib 652 and more successively coupled to the second resonator rib 654. As a result, the transformer-coupling line 674 can have a phase-shift of approximately 18° relative to the in-phase clock signal CLK_I, the transformer-coupling line 676 can have a phase-shift of approximately 27° relative to the in-phase clock signal CLK_I, the transformer-coupling line 678 can have a phase-shift of approximately 36° relative to the in-phase clock signal CLK_I, and the transformer-coupling line 680 can have a phase-shift of approximately 45° relative to the in-phase clock signal CLK_I (based on approximately equal coupling to both of the resonator ribs 652 and 654). Accordingly, a combination of inductive coupling to a subset of the parallel portions of the resonator ribs 652 and 654 can result in inductively generating clock currents $I_{CLK}$ having desired phase-shifts relative to the clock signals CLK_I and CLK_Q. As a result of distributing the total length of the transformer-coupling lines over the resonator ribs 652 and 654, the length of the transformer-coupling lines, and thus the mutual-inductance of the transformer-coupling lines, remains substantially independent of the phase of the transformer-coupling lines.

In the examples of FIGS. 5-14, the inductive coupling of the transformer-coupling lines to the resonator ribs is demonstrated pictorially as the transformer-coupling lines being arranged in the foreground of the resonator ribs. As an example, the transformer-coupling lines can be formed on the respective IC chip on a separate fabrication layer of the IC chip, such that the inductive coupling can be based on an overlay of the layer in which the transformer-coupling lines are formed on the layer in which the resonator ribs are formed. As another example, the inductive couplings can occur across a plurality of different layers, as demonstrated in the examples of FIGS. 15 and 16.

Figure 15:
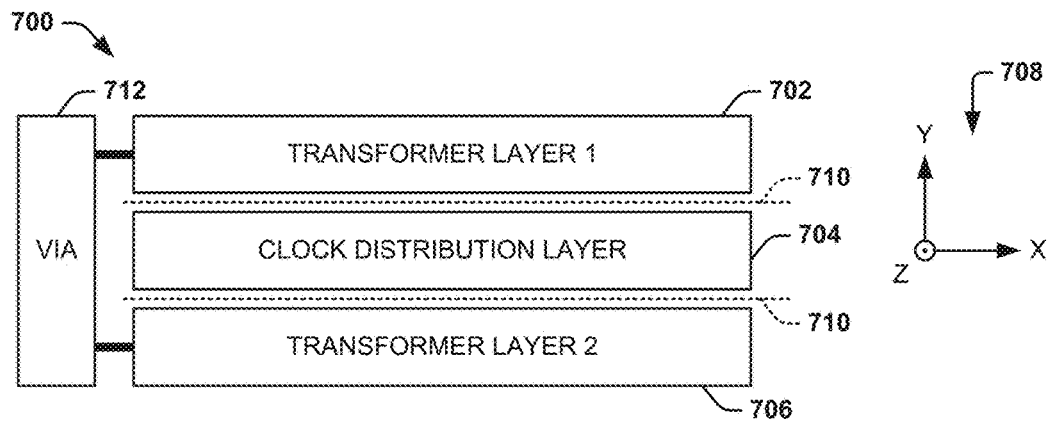
FIG. 15 illustrates another example of a resonator system.

FIG. 15 illustrates another example of a resonator system 700. The resonator system 700 can correspond to a portion of an IC chip in which the clock distribution system 10 is included. The resonator system 700 includes three fabrication layers, a first transformer layer ("TRANSFORMER LAYER 1") 702, a clock distribution layer ("CLOCK DISTRIBUTION LAYER") 704, and a second transformer layer ("TRANSFORMER LAYER 2") 706. In the example of FIG. 15, the layers 702, 704, and 706 are demonstrated in a stack along the Y-axis, as provided by a Cartesian coordinate system 708. As an example, the clock distribution layer 704 can include conductive portions that are patterned during fabrication to form resonator spines and resonator ribs, similar to as described herein, in a planar XZ-layer as provided by the Cartesian coordinate system 708. Similarly, each of the transformer layers 702 and 706 can include conductive portions that are patterned during fabrication to form the transformer-coupling lines that provide the clock current $I_{CLK}$ to the associated circuits (not shown) in planar XZ-layers as provided by a Cartesian coordinate system 708.

As an example, the layers 702, 704, and 706 can be arranged to include gaps between the respective layers 702, 704, and 706, and thus portions of the respective layers 702, 704, and 706 can be non-conductively coupled. However, the proximity of the clock distribution layer 704 to each of the transformer layers 702 and 706 can be such as to provide an inductive coupling between the clock distribution layer 704 and the respective transformer layers 702 and 706, as indicated by the dotted lines 710 there-between. Accordingly, a given one of the resonator ribs associated with the clock distribution layer 704 can be inductively coupled to transformer-coupling lines associated with each of the transformer layers 702 and 706. In the example of FIG. 15, the resonator system 700 further includes a conductive via 712 that extends along the Y-axis and which conductively couples at least a portion of the transformer layers 702 and 706. Accordingly, as described in greater detail herein, the via 712 can form a portion of a single transformer-coupling line that occupies both of the transformer layers 702 and 706, and is thus inductively coupled to opposing surfaces of a given resonator rib or even parallel portion of a resonator rib.

Figure 16:
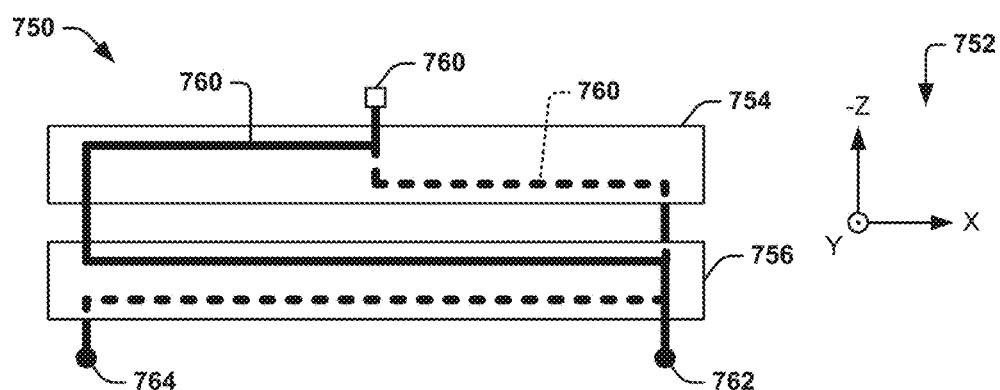
FIG. 16 illustrates another example of the resonator system of FIG. 15.

FIG. 16 illustrates another example diagram 750 of the resonator system 700 of the example of FIG. 15. The diagram 750 can correspond to the resonator system 700 in the example of FIG. 15 that is demonstrated in an orthogonal view relative to the resonator system 700, and thus can be demonstrated as viewed in a −Y-axis of the Cartesian coordinate system 752. The diagram 750 demonstrates a first parallel portion 754 and a second parallel portion 756 that are associated with one or more resonator ribs. As an example, the parallel portions 754 and 756 can be opposite orientation with respect to each other as to the propagation of the clock signal CLK, and can be part of the same resonator rib or can be separate resonator ribs. The parallel portions 754 and 756 can thus occupy the clock distribution layer 704 in the example of FIG. 15.

The diagram 750 also demonstrates a transformer-coupling line 758 that includes a via 760. In the example of FIG. 16, the via 760 can conductively couple two portions of the transformer-coupling line 758 that occupy the respective transformer layers 702 and 706, similar to as described previously in the example of FIG. 15. Particularly, in the example of FIG. 16, the transformer-coupling line 758 extends from one end 762 above the second parallel portion 756, and thus in the first transformer layer 702, and along the second parallel portion 756 in the −X direction. Thus, the transformer-coupling line 762 can be inductively coupled to the second parallel portion 756 along the length of the second parallel portion 756. The transformer-coupling line 762 then crosses over to the first parallel portion 754 in the −Z direction, and extends along the first parallel portion 754 in the X direction in the first transformer layer 702. Thus, the transformer-coupling line 762 can be inductively coupled to the first parallel portion 754 along the length of the first parallel portion 754.

At approximately half the distance along the first parallel portion 754, the transformer-coupling line 758 extends to the via 760 and down to the second transformer layer 706 below the clock distribution layer 704 to the first transformer layer 702. The transformer-coupling line 762 (demonstrated as a dotted line) then extends to below the first parallel portion 754 and extends along the first parallel portion 754 in the X direction in the first transformer layer 702. Thus, the transformer-coupling line 762 can be inductively coupled to the first parallel portion 754 along the remaining length of the first parallel portion 754. The transformer-coupling line 762 then crosses over to the second parallel portion 756 in the Z direction, and extends along the second parallel portion 756 in the −X direction. The transformer-coupling line 762 then extends along the Z direction to a second end 764 below the second parallel portion 756, and thus in the second transformer layer 702.

Accordingly, the diagram 750 demonstrates an example of an inductive coupling of a single transformer-coupling line to a given resonator rib via multiple inductive couplings on the same resonator rib(s) and through separate layers of an IC chip. While the diagram 750 demonstrates one example of implementing an orthogonal via with respect to multiple fabrication layers of an IC chip to provide three-dimensional extension of a given transformer-coupling line, it is to be understood that many different arrangements can be possible to provide inductive couplings on opposing surfaces of a resonator rib in a clock distribution layer 704. As a result, the resonator system 700 demonstrates that a variety of different ways to provide uniformity in the generation of the clock current $I_{CLK}$ and to provide optimized spatial constraints can be implemented in fabricating a given clock distribution system 10.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A clock distribution system comprising:
   at least one resonator that propagates a sinusoidal clock signal, each of the at least one resonator comprises a plurality of bends to provide a plurality of parallel portions of each of the at least one resonator; and at least one transformer-coupling line, each of the at least one transformer-coupling line being conductively coupled to an associated circuit and having a plurality of inductive couplings to at least two of the plurality of parallel portions of each of the at least one resonator to inductively generate a clock current corresponding to the sinusoidal clock signal via each of the plurality of inductive couplings to provide functions for the associated circuit.

2. The system of claim 1, wherein the plurality of parallel portions of each of the at least one resonator being configured to facilitate the plurality of inductive couplings at each of a plurality of inductive-coupling portions of the at least one transformer-coupling line to at least a subset of the plurality of parallel portions, wherein the plurality of bends are arranged to provide the plurality of parallel portions as greater than two parallel portions.

3. The system of claim 2, wherein the at least one transformer-coupling line is arranged as a substantially enclosed loop such that a pair of the plurality of inductive-coupling portions of the respective at least one transformer-coupling line coupled to each of a respective pair of ends is inductively coupled to a same one of the plurality of parallel portions of the respective at least one resonator.

4. The system of claim 2, wherein the at least one transformer-coupling line is arranged as a spiral such that at least two of the plurality of inductive-coupling portions of the respective at least one transformer-coupling line is inductively coupled in parallel to one of the plurality of parallel portions of the respective at least one resonator.

5. The system of claim 1, wherein the at least one resonator comprises a plurality of resonator ribs arranged as a standing wave resonator, wherein each of the at least one transformer-coupling line is inductively coupled to each of the plurality of resonator ribs.

6. The system of claim 5, wherein the at least one resonator comprises a plurality of resonator spines, wherein each of the plurality of resonator ribs is conductively coupled to a respective one of the plurality of resonator spines.

7. The system of claim 6, wherein each of the plurality of resonator ribs are configured as linear extensions between the respective one of the plurality of resonator spines and a low-voltage rail, such that each of the plurality of resonator ribs are arranged as at least one anti-parallel pair of resonator ribs, wherein each of the at least one transformer-coupling line is inductively coupled to the at least one anti-parallel pair of resonator ribs.

8. The system of claim 6, wherein each of the plurality of resonator ribs comprises a plurality of bends arranged in an interleaved anti-parallel configuration with respect to each other, wherein each of the at least one transformer-coupling line comprises the plurality of inductive couplings with respect to each of the plurality of resonator ribs.

9. The system of claim 8, wherein the at least one transformer-coupling line comprises a plurality of inductive-coupling portions, wherein each of the inductive-coupling portions is inductively coupled to a portion of each of the plurality of resonator ribs in the interleaved anti-parallel configuration.

10. The system of claim 6, wherein each of the at least one resonator comprises an inductive load proximal to a coupling of the respective at least one resonator to the at least one of the plurality of resonator spines.

11. An integrated circuit (IC) chip comprising the clock distribution system of claim 1, wherein the at least one resonator is arranged on a clock distribution layer of the IC chip in parallel portions, wherein the IC chip further comprises at least one of a first transformer layer that is arranged above the clock distribution layer of the IC chip and a second transformer layer that is arranged below the clock distribution layer of the IC chip, wherein the at least one transformer-coupling line comprises:

a first portion associated with the first transformer layer that is inductively coupled to the at least one resonator via a first surface of the at least one resonator; and a second portion associated with the second transformer layer that is inductively coupled to the at least one resonator via a second surface of the at least one resonator opposite the first surface, wherein the first and second portions of the respective the at least one transformer-coupling line are conductively coupled by at least one conductive via.

12. A clock distribution system comprising:

a plurality of resonator ribs that each propagate a sinusoidal clock signal; and at least one transformer-coupling line, each of the at least one transformer-coupling line being conductively coupled to an associated circuit and comprising a plurality of bends to form a plurality of inductive-coupling portions, each of the plurality of inductive coupling portions being inductively coupled to at least one of the plurality of resonator ribs to inductively generate a clock current corresponding to the sinusoidal clock signal to provide functions for the associated circuit.

13. The system of claim 12, wherein the plurality of resonators are each arranged as a standing wave resonator.

14. The system of claim 12, wherein the system further comprises a plurality of resonator spines, wherein each of the plurality of resonator ribs is conductively coupled to a respective one of the plurality of resonator spines.

15. The system of claim 14, wherein each of the plurality of resonator ribs are configured as linear extensions between the respective one of the plurality of resonator spines and a low-voltage rail, such that each of the plurality of resonator ribs are arranged as at least one anti-parallel pair of resonator ribs, wherein each of the at least one transformer-coupling line is inductively coupled to the at least one anti-parallel pair of resonator ribs.

16. The system of claim 14, wherein each of the plurality of resonator ribs comprises a plurality of bends arranged in an interleaved anti-parallel configuration with respect to each other, wherein each of the at least one transformer-coupling line comprises the plurality of inductive couplings with respect to each of the plurality of resonator ribs.

17. An integrated circuit (IC) chip comprising the clock distribution system of claim 12, wherein each of the plurality of resonator ribs are arranged on a clock distribution layer of the IC chip in parallel portions, wherein the IC chip further comprises at least one of a first transformer layer that is arranged above the clock distribution layer of the IC chip and a second transformer layer that is arranged below the clock distribution layer of the IC chip, wherein the at least one transformer-coupling line comprises:

a first portion associated with the first transformer layer that is inductively coupled to each of the plurality of resonator ribs via a first surface of each of the resonator ribs; and a second portion associated with the second transformer layer that is inductively coupled to each of the plurality of resonator ribs via a second surface of each of the resonator ribs opposite the first surface, wherein the first and second portions of the respective the at least one transformer-coupling line are conductively coupled by at least one conductive via.

18. A clock distribution system comprising:
at least one resonator that propagates a sinusoidal clock signal and is arranged as a standing wave resonator, each of the at least one resonator comprising a plurality of bends to provide a plurality of parallel portions; and
at least one transformer-coupling line, each of the at least one transformer-coupling line being conductively coupled to an associated circuit, each of the at least one transformer-coupling line being inductively coupled to the plurality of the parallel portions of the at least one resonator to inductively generate a clock current corresponding to the sinusoidal clock signal to provide functions for the associated circuit.

19. The system of claim 18, wherein the at least one resonator comprising a plurality of bends to provide a plurality of parallel portions arranged in an interleaved anti-parallel configuration with respect to each other.

20. An integrated circuit (IC) chip comprising the clock distribution system of claim 18, wherein the at least one resonator is arranged on a clock distribution layer of the IC chip in parallel portions, wherein the IC chip further comprises at least one of a first transformer layer that is arranged above the clock distribution layer of the IC chip and a second transformer layer that is arranged below the clock distribution layer of the IC chip, wherein the at least one transformer-coupling line comprises:

a first portion associated with the first transformer layer that is inductively coupled to the at least one resonator via a first surface of the at least one resonator; and a second portion associated with the second transformer layer that is inductively coupled to the at least one resonator via a second surface of the at least one resonator opposite the first surface, wherein the first and second portions of the respective the at least one transformer-coupling line are conductively coupled by at least one conductive via.

* * * * *